Figure 1:
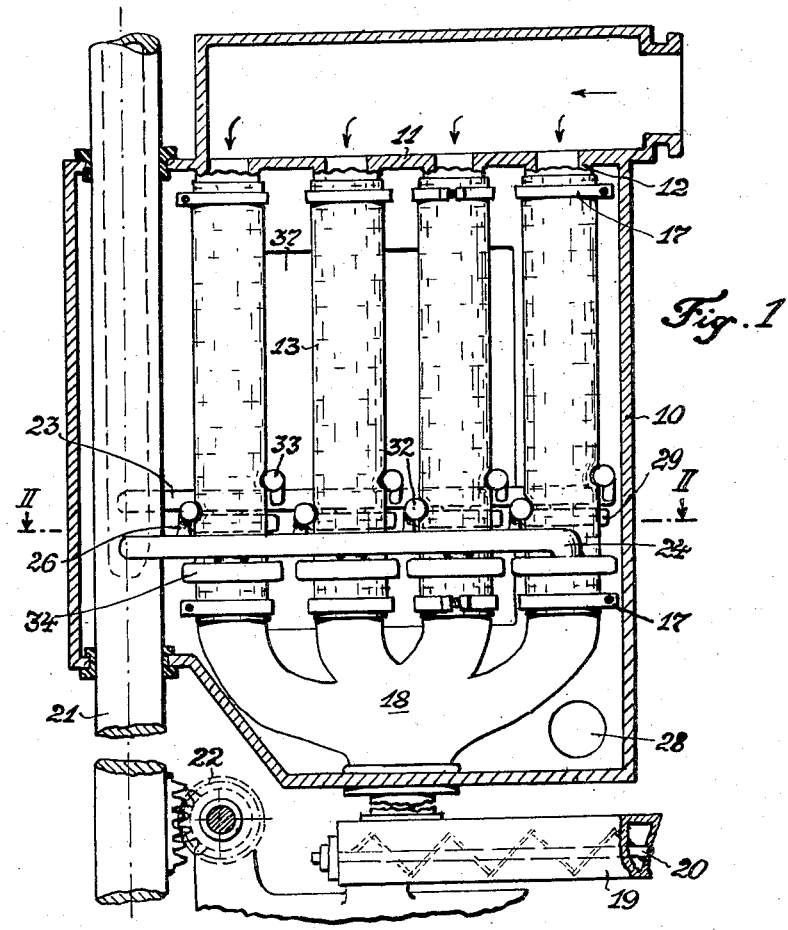

Nov. 25, 1958   H. JUNKMANN   2,861,649
FILTER HOSE CLEANERS
Filed May 3, 1955   2 Sheets-Sheet 2
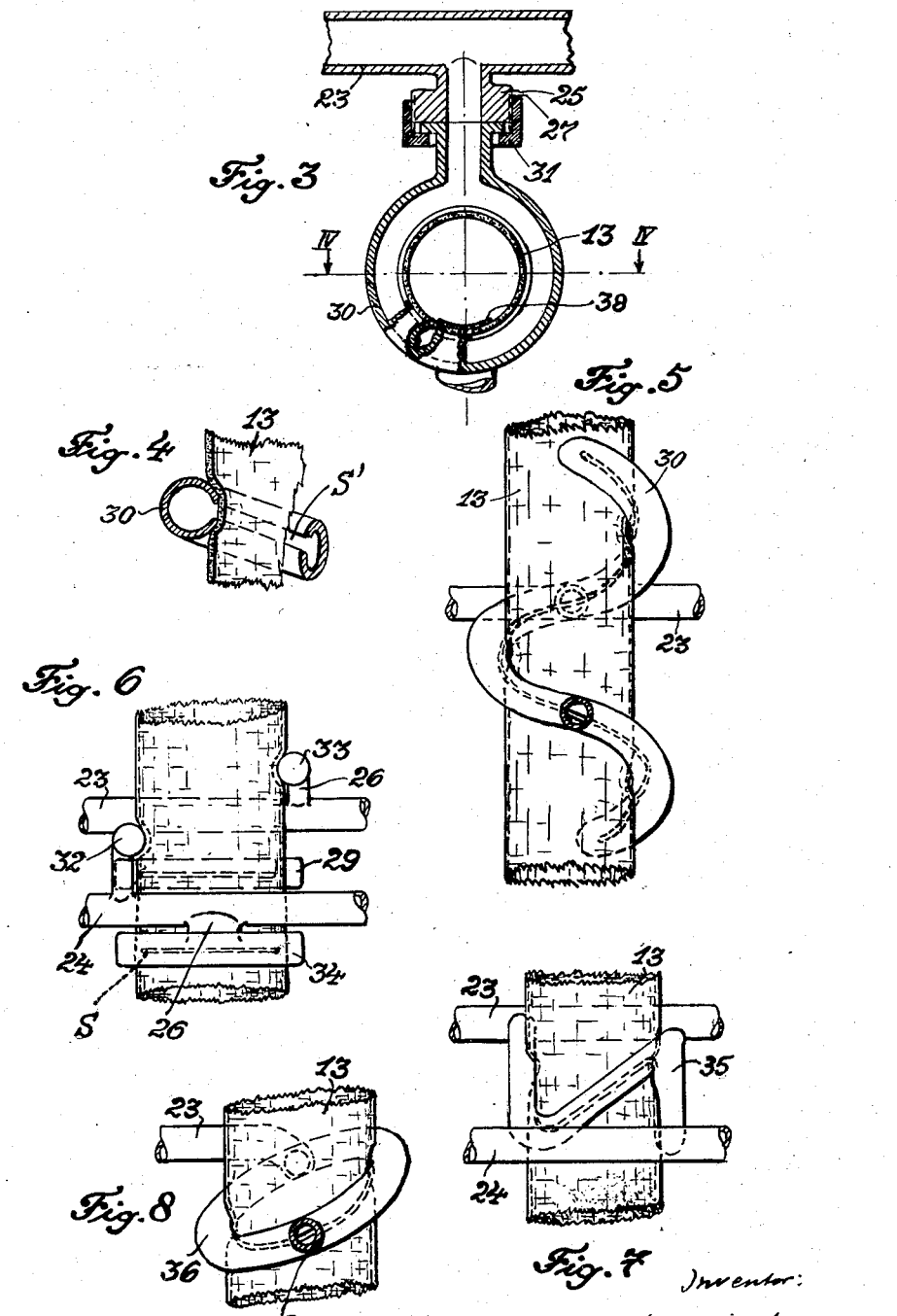

United States Patent Office 2,861,649
Patented Nov. 25, 1958

2,861,649

FILTER HOSE CLEANERS

Heinzjosef Junkmann, Munster, Westphalia, Germany

Application May 3, 1955, Serial No. 505,779

6 Claims. (Cl. 183—61)

My invention relates to filter hose cleaners and more particularly to an improved construction and mounting of cleaning tube means forming part of the apparatus.

Filter hose cleaners according to the prior art have closed rings embracing the filter hoses in horizontal zones for blowing cleaning air or gas upon the hose passing through the cleaners. For mounting and dismounting such closed rings, completely encircling the hose, at least one end of the latter has to be removed from its holding device for passing the blow ring over the hose. Besides such horizontal closed rings engaging a complete horizontal zone of the filter hose easily cause damage in the filtering fabric, since usually the inner diameter of the blow ring is a little smaller than the outer diameter of the filter-hose for contracting the latter in the zone of blowing to bend its walls inwardly and thereby closely engage it at this point in order to facilitate the removal of the deposited dust from the inner surface of the hose. Furthermore, when the cleaning device is arranged in a plane perpendicular to the axis of the hose, each cleaning jet meets within the hose the jet that is blown at the opposite side of the hose, all jets blown by the ring meeting in this way at one point of the axis of the hose cause a whirling motion of the cleaning air within the hose which often detrimentally affects the cleaning operation. At last, closed rings exert a considerable pressure upon the filtering hose when these parts are reciprocated relato each other, because the hose is pressed at the zone in which it is engaged by the ring into a profile of smaller dimension than at adjacent zones and its fabric cannot give place anywhere. Especially when using hoses made of thin material such compression into a smaller profile may cause considerable trouble.

It is an object of the present invention to eliminate these disadvantages of filter hose cleaners according to the prior art.

It is an additional object of the present invention to provide for filter hose cleaners which will cause during the operation thereof, the least possible wear on the hoses or filter elements to be cleaned.

It is an additional object of the present invention to improve the efficiency of the apparatus and to avoid losses of cleaning fluid during the operation of the apparatus.

With these objects in view, the apparatus for cleaning a flexible tubular filter element having a fluid permeable wall comprises essentially support means, cleaning tube means carried by the support means and adapted to surround a filter element engaging the same and formed with opening means or slits directed toward the filter element for directing a stream of fluid through the wall thereof. The tube means being shaped so that in any plane normal to the axis of the filter element the tube means only partly surrounds the filter element so as to provide in each such plane a gap between the surrounding portions of the tube means so that the filter element may in any such plane bulge outwardly through the gap therein, whereby formation of folds between the filter element and the cleaning tube means through which fluid may escape without entering the filter element is prevented. The apparatus includes further reciprocating means for reciprocating the support means and the cleaning tube means carried by the support means in axial direction of the filter element.

The cleaning tube means may have different forms and shapes and in a preferred arrangement these tube means being formed from a plurality of substantially straight tube elements each having a filter element engaging portion adapted to tightly engage the outer surface of the filter element so as to bulge the filter element inwardly and each of the tube elements being formed at the filter element engaging portion thereof with opening means directed toward the outer surface of the filter element for directing a stream of cleaning fluid through the wall of the filter element into the interior thereof. These tube elements, being arranged in pairs, and the elements in each pair being respectively located on opposite sides of the filter element and being spaced from each other a distance greater than the diameter of the tube element, whereas the tube elements in each pair are displaced 90° relative to the tube elements in the adjacent pair.

The clamping tube means may also have the form of an a helical tube which is formed in such a way that the portions of the helical tube which engage the filter element and which are located along any line parallel to the axis of the filter element being spaced from each other a distance greater than the diameter of the tube element.

The cleaning tube means may also have the form of an elliptical tube arranged in a plane inclined to the axis of the filter element, or have the form of a saddle-shaped tube.

This arrangement prevents that fluid jets entering the hose of filter elements from opposite sides are directed against each other and create turbulence of the fluid within the hose. This arrangement further considerably reduces the wear on the hose during the reciprocation of the tube means and prevents escape of cleaning fluid during the operation of the device.

Figure 2:
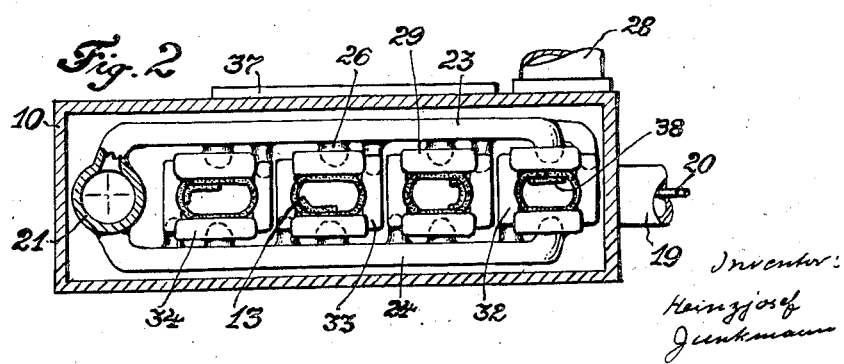

Other and further objects and advantages of my invention will appear in connection with the following specification and drawing, in which Fig. 1 is a sectional view of a filtering apparatus in elevation, Fig. 2 is a horizontal section according to line II—II of Fig. 1, Fig. 3 is a sectional view showing a modified arrangement for attaching the cleaning tube means, Fig. 4 is a partial sectional view, showing an arrangement of a cleaning tube element relative to the hose or filter element, Fig. 5 is a partially sectioned front view drawn to an enlarged scale and showing a modification of the cleaning tube means shown in Fig. 1, Fig. 6 is a partially sectioned front view and showing the cleaning tube means shown in Fig. 1 to an enlarged scale, and Figs. 7 and 8 are respectively partially sectioned front views drawn to an enlarged scale and showing further modifications of the cleaning tube means.

Referring to the drawing, 10 is a casing of a filtering apparatus the upper part of which is separated from the rest of the casing by a partition 11 formed with apertures therethrough bordered by flanges 12. Filtering hoses 13 are fastened at the top ends thereof to flanges 12 by means of spanning rings 17, the bottom ends of these hoses 13 being secured by spanning rings of the same sort to the branches of a manifold 18 arranged at the bottom of the casing 10. The lower end of manifold 18 communicates with the chamber 19 of a conveyor screw 20. Parallel to the axis of the hoses 13 a vertical rod 21 is slidably arranged within the casing 10, this rod being adapted to be moved up and down by means of a driving device 22 provided at the outside of the casing 10. The rod 21 carries horizontal hollow arms 23 and 24 and it is provided with a central boring extending from its upper end—not shown in the drawing—down the lower arm 24 and being connected with the latter as well as with the upper arm 23. This boring of the rod 21 is at its upper end (not illustrated) in connection with a suitable compressed air conduit by any flexible or slidable means. As shown in Figs. 1, 2 and 6, the arms 23 and 24 respectively carry substantially straight tube elements 29, 32, 33 and 34 arranged so as to surround each of the filter elements 13. The tube elements 29, 32, 33, 34 are respectively connected to the arms 23 and 24 by short tube sections 26 which extend substantially normal to the arms 23 and 24 and which are out of contact with the outer surface of the filter elements 13. It is understood that these tube sections 26 communicate at one end thereof with the interior of the arms to which they are attached and at the other end thereof with the tube elements they respectively carry. As best shown in Fig. 6, each of the tube elements 29, 32, 33, 34 tightly engage the outer surface of the filter element 13 so as to bulge the filter element inwardly and each of the tube elements being formed at the portion thereof along which it engages the outer surface of the filter element 13 with opening means or a slit S directed toward the outer surface of the filter element for directing a stream of cleaning fluid through the wall of the filter element into the interior thereof. The tube elements being respectively arranged in pairs and the elements 32 and 33 of the upper pair as well as the elements 29 and 34 of the lower pair are respectively arranged on opposite sides of the filter element 13 and the tube elements in each pair are spaced from each other in axial direction of the filter element 13, as clearly shown in Fig. 6, a distance greater than the diameter of the tube elements. The tube elements 32, 33 of the upper pair are displaced 90° relative to the tube elements 29, 34 of the lower pair. It is evident that, in this arrangement as shown in Figs. 1, 2 and 6, the cleaning tube means formed by the tube elements 29, 32, 33, 34 are arranged in such a way so that in any plane normal to the axis of the filter element 13 the tube means only partly surrounds the filter element 13 so as to provide in each such plane a gap between the surrounding portions of the tube means through which the filter element may bulge outwardly. Formation of folds between the filter element and the cleaning tube means are thus prevented and the tube elements will always tightly engage the filter element 13 so that fluid may not escape between the engaging portions of the tube elements and the outer surface of the tubular filter 13. The efficiency of the apparatus is, therefore, considerably increased. Furthermore, since the filter element 13 is not restricted in any plane to a smaller diameter, excessive stresses in the filter element 13 are avoided during reciprocating of the cleaning tube means.

Instead of forming the cleaning tube means from separate tube elements as shown in Figs. 1, 2 and 6, the cleaning tube means may be formed from a spiral tube as shown in Figs. 3, 4 and 5. As best shown in Fig. 5, the cleaning tube means in this modification are formed from a spiral tube 30 which tightly engages, as best shown in Fig. 4, the outer surface of the filter element 13. The spiral tube 30 is formed at the portion thereof engaging the filter element 13 with an elongated slot S'. As clearly shown in Fig. 5, the filter element engaging portions of the helical tube 30, which are located on any line parallel to the axis of the filter element 13, are spaced from each other a distance considerably greater than the diameter of the tube 30. Therefore, in this modification, too, the tube means are also shaped so that, in any plane normal to the axis of the filter element, the tube means only partly surrounds the filter element so as to provide in each such plane a gap between the surrounding portions of the tube means wide enough so that the filter element may in any such plane bulge outwardly through this gap so that formation of folds between the filter element 13 and the spiral tube 30 is prevented. The spiral tube 30 is preferably removably attached to the arm 23, as shown in Fig. 3. As clearly shown in Fig. 3, the tube section 25 extending from the arm 23 and carrying the helical tube 30 is formed at the peripheral end portion thereof with a screw thread 27 and a hollow nut 31 screwed onto the thread 27 and engaging with an inwardly directed flange an outwardly directed flange on the helical tube 30 removably attaches the helical tube 30 to the arm 23.

A different modification of the cleaning tube means is shown in Fig. 7. In this figure, the tube 35 is saddle-shaped or wave-shaped and it extends from the arm 23 substantially in the shape of a Z around the front part of the tube element 13 toward the arm 24 and from the arm 24 in a similar manner over the rear half of the element 13 again back to the upper arm 23.

A further modification is shown in Fig. 8, in which the cleaning tube means are in the form of an elliptical tube 36 surrounding the hose 13. This elliptical tube 36 is arranged in a plane inclined to the axis of the hose 13.

For convenient exchange of the hose 13 as well as of any of the removably attached tube elements, an opening is provided at the wall of the casing 10, the opening being closed by a cover 37 in the usual manner.

In operating the apparatus described hereinbefore, dust laden air or gas is supplied into the casing 10 by leading it into the compartment at its top and from there into the interior part of the four hoses 13 as indicated by black arrows in Fig. 1. The air or gas is passed through the fabric of the hoses and the dust or any other solid particles are deposited upon its inner surface. Continuously during this operation of the filter or, depending to the quantity of dust carried by the stream of air or gas, in certain time intervals, high pressure air or gas is conveyed into the elongated bore of the rod 21 and passes from there through the bores in the arms 23 and 24 and through the tube elements 29, 32, 33, 34 or respectively through the tubes 30, 35, or 36 to be finally ejected through the slits formed in the tubes onto wall portions of the filter element or hose 13 to blow off the dust clinging to the inner face of the hose 13, thus restoring the filtering ability of the hose. By moving at the same time the rod 21 in longitudinal direction all portions of the hose are cleaned. Undue stresses on the hose are avoided during reciprocation of the cleaning tube means, due to the fact that the tube means do not restrict the hose in a plane normal to its axis into a narrowed circle. Since fold formation between the tube means and the hose surface is also avoided, all of the compressed fluid emanating from the slits of the tube means will be forced to pass through the hose wall and the efficiency of the apparatus will be thereby greatly increased.

The high pressure air or gas leaving the tubes through their slits passes through each place of the walls of the hoses and removes the dust from their interior surfaces so as to fall down into the manifold 18 for being carried off by the screw conveyor 20. The removing of the dust from the fabric is favoured by the tubes by crushing the dust cake since the fabric is bent thereby at every spot.

The hoses 13 are produced of pieces of fabric, the lateral edges of which are sewed together in the manner of a butt joint having a cover band 38 at the inner side. Thus, the hose though not being fabricated by expensive round weaving or weaving bone lace and the like has a smooth circumferential outer surface without any step or overlapping part, the hoses thus being surely prevented from being pricked by any edge or end portion of the blowing tubes, though these may strongly be pressed against their walls.

As will be seen from the drawing, the bottom ends of the hoses 13 do not reach down near to the bottom of the casing 10. On the contrary, there is a considerable distance between these ends of the hoses and this bottom, and so, a free room is formed above the bottom of the casing 10. This room serves not only for containing the manifold 18, but more important, during the air and gas cleaning operation of the apparatus, the cleaned air or gas after passing through the walls of the hoses will lose its speed in the space surrounding the manifold 18 before it as carried off through the conduit 28.

In former apparatus, complicated devices have often been provided for quieting the cleaned air or gas. It must be considered that this cleaned air and gas still contains small quantities of fine dust and the like, especially when the hoses have been used already during a considerable period. Especially, if the dust contained in the raw air and gas has some corrosive or caustic quality, it is of great importance that the air and gas when carried off through the conduit 28 is absolutely free from such troubling material. According to my invention this is surely obtained, since all such particles are deposited upon the bottom of the casing 10, because the cleaned air and gas does not at once stream off from the walls of the filter hoses, but stays for some time in the spacious room beneath the bottom ends of the hoses.

While only these forms of my invention have been illustrated and described, it is obvious that those skilled in the art may vary the details of construction as well as the precise arrangement of parts without departing from the spirit and scope of my invention and therefore I do not wish to be limited to the above disclosure except as may be required by the appended claims.

What I claim is:

1. Apparatus for cleaning a flexible tubular filter element having a fluid-permeable wall comprising, in combination, support means; cleaning tube means carried by said support means and adapted to surround a filter element engaging the same and formed with opening means directed towards said filter element for directing a stream of fluid through the wall thereof, said tube means being formed so that in any plane normal to the axis of the filter element said tube means only partly surrounds said filter element and including two filter engaging oppositely arranged tube portions spaced from each other in axial direction of said tubular filter element a distance greater than the diameter of said tube portions so as to provide between said tube portions a gap extending in axial and circumferential directions with respect to said tubular filter element whereby upon engagement of said filter element by said cleaning tube means said filter element may in any plane bulge outwardly through said gap therein preventing formation of folds between said filter element and said cleaning tube means through which fluid may escape without entering said filter element; and reciprocating means for reciprocating said support means and said cleaning tube means carried by said support means in axial direction of the filter element.

2. Apparatus for cleaning a tubular flexible filter element having a fluid permeable wall comprising, in combination, support means; cleaning tube means adapted to surround the filter element and including at least one tube element of a given diameter carried by said support means and having filter engaging portions adapted to tightly engage the outer surface of the filter element so as to bulge the filter element inwardly, said filter engaging portions being formed with opening means directed toward the outer surface of the filter element for directing a stream of cleaning fluid through the wall of the filter element in the interior thereof, said tube means being formed so that in any plane normal to the axis of the filter element the filter engaging portions extend only partly around said filter element and so that any filter engaging portions of said tube means located along a line parallel to the axis of the filter element are spaced from each other a distance greater than the diameter of the tube element, so as to provide in each such plane a gap between the surrounding portions of the tube means wide enough so that said filter element may in any such plane bulge outwardly through said gap preventing thereby formation of folds between the filter element and said cleaning tube means through which fluid may escape without entering the filter element; and reciprocating means for reciprocating said support means and said cleaning tube means carried by said support means in axial direction of the filter element.

3. Apparatus for cleaning a tubular flexible filter element having a fluid permeable wall comprising, in combination, support means; cleaning tube means adapted to surround the filter element, said tube means being formed of a plurality of substantially straight tube elements each having a filter element engaging portion adapted to tightly engage the outer surface of the filter element so as to bulge the filter element inwardly and each of said tube elements being formed at said filter element engaging portion thereof with opening means directed toward the outer surface of the filter element for directing a stream of cleaning fluid through the wall of the filter element into the interior thereof, said tube elements being arranged in pairs and the elements in each pair being respectively located on opposite sides of the filter element and being spaced from each other in axial direction of the filter element a distance greater than the diameter of the tube element and the tube elements in each pair are displaced 90° relative to the tube elements in the adjacent pair, said tube elements being connected only to said support means and to portions thereof spaced from the filter element so that in any plane normal to the axis of the filter element said tube means only partly surrounds said filter element so as to provide in each such plane a gap between the surrounding portions of the tube means, whereby upon engagement of said filter element by said cleaning tube means said filter element may in any plane bulge outwardly through said gap therein preventing formation of folds between the filter element and said cleaning tube means through which fluid may escape without entering said filter element; and reciprocating means for reciprocating said support means and said cleaning tube means carried by said support means in axial direction of the filter element.

4. Apparatus for cleaning a flexible tubular filter element having a fluid-permeable wall comprising, in combination, support means; cleaning tube means carried by said support means and adapted to surround a filter element engaging the same and formed with opening means directed towards said filter element for directing a stream of fluid through the wall thereof, said tube means being formed from a helical tube and the portions of said helical tube engaging the filter element and located along any line parallel to the axis of the filter element being spaced from each other a distance greater than the diameter of the tube so that in any plane normal to the axis of the filter element said tube means only partly surrounds said filter element so as to provide in each such plane a gap between the surrounding portions of the tube means, whereby upon engagement of said filter element by said cleaning tube means said filter element may in any plane bulge outwardly through said gap therein preventing formation of folds between said filter element and said cleaning tube means through which fluid may escape without entering said filter element; and reciprocating means for reciprocating said support means and said cleaning tube means carried by said support means in axial direction of the filter element.

5. Apparatus for cleaning a flexible tubular filter element having a fluid-permeable wall comprising, in combination, support means; cleaning tube means carried by said support means and adapted to surround a filter element engaging the same and formed with opening means directed towards said filter element for directing a stream of fluid through the wall thereof, said tube means having the form of an elliptical tube arranged in a plane inclined to the axis of the filter element and including two filter engaging oppositely arranged tube portions spaced from each other in axial direction of said tubular filter element a distance greater than the diameter of said tube portions so as to provide between said tube portions a gap extending in axial and circumferential directions with respect to said tubular filter element whereby upon engagement of said filter element by said cleaning tube means said filter element may in any plane bulge outwardly through said gap therein preventing formation of folds between said filter element and said cleaning tube means through which fluid may escape without entering said filter element; and reciprocating means for reciprocating said support means and said cleaning tube means carried by said support means in axial direction of the filter element.

6. Apparatus for cleaning a flexible tubular filter element having a fluid-permeable wall comprising, in combination, support means; cleaning tube means carried by said support means and adapted to surround a filter element engaging the same and formed with opening means directed towards said filter element for directing a stream of fluid through the wall thereof, said tube means having the form of a saddle-shaped tube and being shaped so that in any plane normal to the axis of the filter element said tube means only partly surrounds said filter element so as to provide in each such plane a gap between the surrounding portions of the tube means, whereby upon engagement of said filter element by said cleaning tube means said filter element may in any plane bulge outwardly through said gap therein preventing formation of folds between said filter element and said cleaning tube means through which fluid may escape without entering said filter element; and reciprocating means for reciprocating said support means and said cleaning tube means carried by said support means in axial direction of the filter element.

References Cited in the file of this patent
UNITED STATES PATENTS 2,511,817    Sheldon _____ June 13, 1950

FOREIGN PATENTS 255,876    Germany _____ Jan. 23, 1913
737,109    Germany _____ July 7, 1943